July 4, 1961 W. ABECK ET AL 2,991,198
MAGNETIC RECORD CARRIERS
Filed Oct. 29, 1957
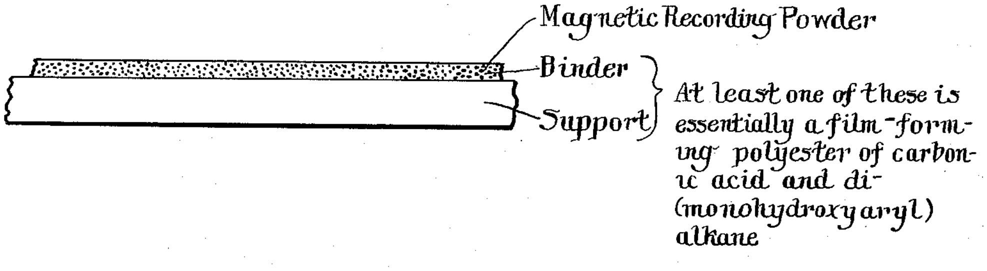
INVENTORS
Wilhelm Abeck
Armin Ossenbrunner
Helfried Klockgether
Julius Geiger
Hermann Schnell
BY Connolly and Hutz
ATTORNEYS

United States Patent Office 2,991,198

Patented July 4, 1961

2,991,198

MAGNETIC RECORD CARRIERS

Wilhelm Abeck, Koln-Stammheim, and Armin Ossenbrunner, Helfried Klockgether, and Julius Geiger, Leverkusen, and Hermann Schnell, Krefeld-Urdingen, all of Germany, assignors to AGFA Aktiengesellschaft Filed Oct. 29, 1957, Ser. No. 692,999
Claims priority, application Germany Nov. 3, 1956
8 Claims. (Cl. 117—138.8)

The present invention relates to magnetic record carriers.

Magnetic record carriers as they are used for the magnetic recording and reproduction of sound and other fluctuating signal energy usually consist of a non-magnetizable support and have a lacquer coating in which magnetic particles are dispersed.

Magnetic record carriers are known in which the carriers for the recording layer consist of a wide range of different film-forming plastics, for example cellulose esters, cellulose ethers, polyvinyl chloride, polyurethanes, polyesters, and polyamides. These compounds have also been used as binders for magnetic substances. It has however been found that these plastics do not fully satisfy the more stringent technical demands as regards mechanical strength, mechanical and chemical resistance, resistance to temperature and also dimensional stability.

It has now been found that magnetic record carriers equal to the more stringent demands are obtained if the support for the magnetic layer, or the binder for the magnetic substances, or both, comprise a thermoplastic polycarbonate produced from di-(monohydroxyaryl)-alkanes, preferably 4,4′-di-(monohydroxyaryl)-alkanes.

This is illustrated in the accompanying figure showing a side view of a section of magnetic recording medium representative of the present invention.

Such polycarbonates can for example be produced by reacting substantially equimolar proportions of di-(monohydroxyaryl)-alkanes and bis-chlorocarbonic acid esters of di-(monohydroxyaryl)-alkanes or of di-(mono-hydroxyaryl)-alkanes with phosgene or with carbonic acid diesters, for example by the process disclosed in German patent application No. F 13 040 IV*c*/39*c* (now German Patent 971,790). For the formation of the polycarbonates, it is also possible to use mixtures of different di-(monohydroxyaryl)-alkanes and also mixtures of di-(monohydroxyaryl)-alkanes with other dihydroxy compounds, for example by the process disclosed in German patent application No. F 17 166 IV*c*/39*c* (corresponding applications for which have matured into Belgian Patent 546,375 and French Patent 1,149,261).

Examples of polycarbonates which are particularly suitable are those obtained by using the following dimonohydroxy aryl alkanes:

4,4′-dihydroxy diphenyl methane, 4,4′-dihydroxy diphenyl dimethyl methane, 4,4′-dihydroxy diphenyl-1,1-cyclohexane, 4,4′-dihydroxy-3,3′-dimethyl diphenyl-1,1-cyclohexane, 2,2′-dihydroxy-4,4′-di-tert.-butyl diphenyl dimethyl methane, 4,4′-dihydroxy diphenyl-3,4-n-hexane, 2,2-(4,4′-dihydroxy diphenyl)-3-methyl butane, 2,2-(4,4′-dihydroxy diphenyl)-hexane, 2,2-(4,4′-dihydroxy diphenyl)-4-methylpentane, 2,2-(4,4′-dihydroxy-diphenyl)-heptane, and 2,2-(4,4′-dihydroxy-diphenyl)-tridecane.

The polycarbonates of high molecular weight based on 4,4′-di-(monohydroxy-aryl)-alkanes conform to the following general formula:

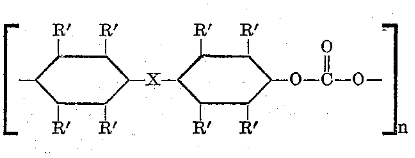

wherein

X is a

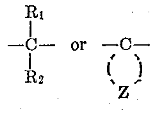

grouping $R_1$ and $R_2$ are hydrogen atoms, branched or unbranched monovalent hydrocarbon radicals with not more than 10 carbon atoms, monovalent cyclo-aliphatic radicals, monovalent or aliphatic radicals, phenyl or furyl radicals, Z represents the atom groupings which, together with the adjacent carbon atoms, form a cyclo-aliphatic ring, Each R′ is a hydrogen atom, a monovalent, branched or unbranched aliphatic hydrocarbon radical with up to five carbon atoms, or a monovalent cycloaliphatic or aromatic hydrocarbon radical, and $n$ is a whole number larger than 20, preferably larger than 50.

For the formation of the polycarbonates, it is also possible to use mixtures of di-monohydroxyaryl alkanes with other dihydroxy compounds, such as aliphatic, cycloaliphatic dihydroxy compounds as well as aromatic dihydroxy compounds which are different from those mentioned above.

As examples of the accompanying dihydroxy compounds which may be used according to the invention, the following are named by way of example:

Aliphatic dihydroxy compounds such as: ethylene glycol, diethylene glycol, triethylene glycol, polyethylene glycol, thiodiglycol, ethylene dithiodiglycol, the di-, and polyglycols produced from propyleneoxide-1,2, o-, m-, or p-xylene glycol, propanediol-1,3, butanediol-1,3, butanediol-1,4, 2-methylpropanediol-1,3, pentanediol-1,5, 2-ethyl propanediol-1,3, hexanediol-1,6, octanediol-1,8, 1-ethylhexane-diol-1,3, and decanediol-1,10, cycloaliphatic dihydroxy compounds such as cyclohexanediol-1,4, cyclohexanediol-1,2, 2,2-(4,4′-dihydroxy-dicyclohexylen)-propane and 2,6-dihydroxydecahydronaphthalene and aromatic dihydroxy compounds such as hydroquinone, resorcinol, pyrocatechol, 4,4′-di-hydroxydiphenyl, 2,2′-dihydroxydiphenyl, 1,4-di-hydroxy-naphthalene, 1,6-dihydroxynaphthalene, 2,6-dihydroxynaphthalene, 1,2-dihydroxynaphthalene, 1,5-dihydroxynaphthalene, dihydroxyanthracene, 2,2′-dihydroxydinaphthyl-1,1′ and o-, m-, p-hydroxybenzylalcohol.

These mixed polycarbonates can be produced in the same way as the simple polycarbonates, that is to say: mixtures of the aforesaid di-monohydroxyarylen alkanes with other dihydroxy compounds of the type mentioned above can be reacted with derivatives of the carbonic acid selected from the group consisting of carbonic diesters, especially diarylesters, phosgene and bis-chlorocarbonic acid esters of dihydroxy compounds.

Particularly suitable polycarbonates can for example be obtained from 4,4′-dihydroxydiphenyl dimethyl methane or from 4,4-dihydroxydiphenyl methyl ethyl methane or from a mixture of 95% of 4,4′-dihydroxydiphenyl dimethyl methane with 5% of 4,4′-dihydroxydiphenyl methane or of 90% of 4,4′-dihydroxydiphenyl dimethyl methane with 10% of 4,4′-dihydroxydiphenyl-1,1-cyclohexane.

The magnetic record carriers produced from said polycarbonates are characterized by excellent mechanical properties. In the unstretched condition, the tensile strength thereof is practically equivalent to that of an acetyl cellulose foil. The extensibility and resistance to impact are substantially higher. By stretching, it is possible to produce tear resistance which is equal to that of polyesters produced from terephthalic acid and glycols, and simultaneously good extensibility and impact resistance. It is moreover particularly to be noted that these good mechanical properties are also maintained in the unstretched condition and when the carriers are subjected to temperatures up to about 160° C. for a relatively long period. Thus, after such carriers had been stored at 140° C. in air, it was not possible to detect any deterioration in the mechanical properties even after six weeks. Moreover, the carriers have excellent resistance to the action of light, even ultra-violet radiation, and to the action of air and moisture. The water absorption is extremely small (0.5% or less), so that the films have excellent stability of shape even in the wet condition.

As compared with a support consisting of acetyl cellulose, the foils made of polycarbonates have a higher strength factor, especially a higher resistance to edge-tearing, higher resistance to heat and therefore no embrittlement, and greater resistance to moisture and therefore lower elongation when moist.

As compared with polyvinyl chloride, polycarbonate foils have higher heat resistance, so that they less readily become thermoplastic.

As compared with foils consisting of polyethylene terephthalate, polycarbonate foils soften substantially better under the action of solvents so that good adhesion of the layer cast thereon is produced.

Since the polycarbonates to be used in accordance with the invention are readily soluble in a series of solvents, including low-boiling solvents, foils can be prepared therefrom by the conventional casting processes on a band of drum machine, the advantages of this process, namely the production of foils of uniform thickness and optical clarity in the interior and on the surface, being fully utilized. After being thoroughly dried the raw material is dissolved in a stirrer-type mechanism, preferably a high-speed stirrer, for example in methylene chloride, to give a solution with a viscosity of about 50,000 cp. It is possible to add small proportions of solvents with a higher boiling point, which do not necessarily have to be good solvents for the plastic (such as chloroform, propyl acetate and butyl acetate). Depending on the type of foil which is required, it may also be desirable to add small proportions of plasticizers. After air has been removed, the solution is cast on a casting machine to give the desired thickness and at the speed usual for acetyl cellulose foils. If desired, the polyesters used in accordance with the invention can also be processed from the melt to provide films in a manner known per se. It is, of course, also possible for dyes or pigments to be added to the solutions or melts of the polycarbonates prior to the forming operation.

The magnetic layer can be applied to a polycarbonate support prepared in this manner, and the binders used can be polycarbonates or other film-forming plastics, for example cellulose esters, mixed cellulose esters, cellulose ethers, polyvinyl chloride, polyamides, polyurethanes, such as reaction products of organic isocyanates having two or more functional groups with polyhydroxy compounds, polyesters, film-forming polymers or copolymers derived from ethylenically unsaturated monomers and/or aliphatic conjugated dienes having 4–6 carbon atoms as they are well known in the art of producing magnetic tapes.

Acetals produced from linear organic polymers containing hydroxy groups and aldehydes also give very good properties as binding agents for the magnetic particles.

Particularly suitable are (1) linear organic polymers containing hydroxy groups, and (2) aromatic aldehydes containing at least one sulfonic acid group, which sulfonic acid groups are at least partially neutralized by means of alkali metal. The effective units of said components may be illustrated by the following formula:

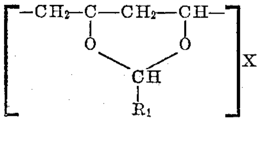

in which $R_1$ stands for an aryl group, such as a phenyl or naphthyl group which is substituted by at least one sulfonic acid group which latter is neutralized by alkali metal, such sodium or potassium.

Suitable polymers for the production of the above acetals are for instance polyvinylalcohol (molecular weight preferably about 10,000–500,000) polyvinylalcohols containing acyl groups, such as acetyl groups, propionyl groups, partially hydrolyzed copolymers of vinylchloride and organic vinylesters such as vinyl esters and further ethylenically unsaturated monomers such as acrylic acid, methacrylic acid, fumaric acid, maleic acid, maleic acid anhydride, esters of said acids with aliphatic, cycloaliphatic and araliphatic alcohols such as methyl, propyl, butyl, cyclohexyl, benzylalcohol, monovinyl aromatic compounds such as styrene, vinylalkylethers, ethylene, propylene or other ethylenically unsaturated aliphatic hydrocarbons. These polymers preferably contain hydroxy groups in such an amount that after acetalization with the aromatic aldehydes, products are obtained which have a sulfur content of 5–10% by weight, said sulfur content being due to the sulfonic acid groups of said aldehydes. These aforementioned acetals may furthermore be obtained by reacting polymers of an organic vinyl ester, such as polyvinylacetate in alcoholic solution with an aldehyde sulfonic acid, whereby acetalization takes place under cleavage of the ester group.

Suitable aldehydes for producing the aforementioned acetals are for instance benzaldehyde mono-sulfonic acid, benzaldehyde disulfonic acid, the corresponding derivatives which are substituted in the phenyl nucleus by alkyl or halogen groups, such as tolylaldehyde sulfonic acid. Furthermore, it is within the scope of the present invention to introduce into the polymers besides the aforementioned aldehyde sulfonic acid aliphatic, aromatic or araliphatic aldehydes which are free from sulfonic groups or other reactive groups such as acetaldehyde, butylaldehyde, benzaldehyde, chlorobenzaldehyde, tolylaldehyde. These latter aldehydes are preferably introduced into the polymers in quantities amounting to 0.1–3 moles as calculated on 1 mole of an aldehyde sulfonic acid.

The acetals of the present invention are produced according to known methods. The components are applied in form of 10–15% solutions in water or methanol or mixtures of both, whereby further organic solvents such as dioxane may be added. As catalysts there are used mineral acids as for instance hydrochloric or sulfuric acid in an amount of about 1–5% as calculated on the components to be reacted. The reaction mixture is kept at about 60–70° C.

By comparison with foils consisting of polyvinyl chloride and polyesters, the foils made from polycarbonates are characterized by ready softening of their surfaces with polar solvents, so that a very good bonding action is obtained when the iron oxide casting solution is applied, without any kind of adhesion-promoting intermediate layers being necessary.

Furthermore, it is possible for cellulose esters, mixed cellulose esters, cellulose ethers, polyvinyl chloride, polyamides, polyurethanes, polyesters or other known film-forming compounds to be used for the support and polycarbonates to be used as binder for the magnetic material.

The composition of the solution used for the production of the magnetic layer depends partly on the binder and partly on the film-forming plastic of the support. Any of the known ferromagnetic substances, for example iron oxides, mixtures of oxides of divalent and trivalent iron such as gamma $Fe_2O_3$, or $Fe_3O_4$, in which part of the iron may be replaced by other metals such as cobalt, manganese or copper, furthermore iron powder can be used for the production of the magnetic layer. The proportions of magnetic powder to binding agent are kept between about 5 and 1, preferably between about 2:1 and about 4:1.

It is moreover possible for the polycarbonate support to be provided with a magnetic layer which is produced for example by cathodic atomization of magnetic materials or by being applied by vaporisation under high vacuum.

Furthermore, it is possible to incorporate the magnetic powders into the polycarbonate foils in order to produce one-layer magnetic recording media.

*Example 1*

250 g. of γ-ferric oxide are ground with a solution of 85 g. of a polycarbonate obtained from 4,4'-dihydroxy diphenyl methyl ethyl methane in 600 cc. of ethyl acetate and with 280 cc. of carbon tetrachloride in a vibrating mill for 16 hours and the ferric oxide lacquer suspension thus obtained is cast by means of a strip-type casting device (feed hopper) on a highly polished metal band of a foil-casting machine, so that the thickness of the magnetizable layer in the dry state is 0.005 to 0.025 mm.

A 17% solution of a polycarbonate obtained from 4,4'-dihydroxy diphenyl dimethyl methane in methylene chloride is poured at a second casting position on the same casting machine on to the above magnetizable layer after the surface of this layer has just dried on. The thickness of the cast combination of layers in the dry state is 0.015 to 0.2 mm., this depending on the purpose for which the magnetic record carrier is to be used.

The magnetizable layer has excellent adhesion to the support and has a perfectly smooth surface.

*Example 2*

An iron oxide lacquer suspension, which has been prepared from 275 g. of γ-ferric oxide in a solution of 60 g. of a mixed acetal produced from polyvinylalcohol, benzaldehyde and the sodium salt of benzaldehyde-2,4-disulfonic acid (consisting of 24% benzaldehyde disulfonate acetal groups, 36% benzaldehyde acetal groups and 30% vinyl alcohol groups) and 18 g. of a saponification product of a vinylchloride-vinylacetate copolymer (consisting of 65% vinyl chloride groups, 27% vinyl alcohol groups and 8% vinyl acetate groups) in 480 cc. of methyl alcohol and 400 cc. of acetone by grinding these components for 24 hours in a vibrating mill, is applied by means of a strip-type casting device on to a polycarbonate foil of 4,4'-dihydroxy diphenyl dimethyl methane, the foil having a thickness of 0.04 mm. The coated film is dried in a hot duct at a temperature of 80° C.

The magnetizable layer may have a thickness of 0.005 to 0.04 mm. It adheres satisfactorily to the support, and it has high mechanical strength and a smooth surface.

*Example 3*

A polycarbonate foil consisting of 4,4'-dihydroxy diphenyl dimethyl methane with a thickness of 0.13 mm. is coated by the dipping process with a casting solution which is prepared in accordance with German patent specification No. 814,225 by grinding 460 g. of γ-iron oxide with a solution of 110 g. of a polyester of 3 mols of adipic acid and 2 mols of hexanetriol and 2 mols of butylene glycol in 250 cc. of ethyl acetate and 200 cc. of toluene in a vibrating mill (grinding time 36 hours), and to which after the grinding there is added a solution of 79 g. of an addition product of 3 mols of toluylene diisocyanate with 1 mol of hexanetriol in 155 cc. of ethyl acetate and 140 cc. of toluene.

The coated foil is heated in a drying duct to a temperature of 120° C. The magnetizable layer (the thickness of which can be varied between 0.01 and 0.04 mm.) has an excellent mechanical strength and good bonding power with the support after the lacquer components have been condensed.

*Example 4*

A polycarbonate foil of 4,4'-dihydroxy diphenyl dimethyl methane with a thickness of 0.1 mm. is coated, by means of a strip-type casting device, with an iron oxide lacquer suspension which has been prepared by grinding 286 g. of γ-iron oxide with a solution of 112 g. of low-viscosity ethanol-soluble nitrocellulose and 42 g. of butyl benzyl phthalate in 790 cc. of a solvent mixture (ethyl alcohol:ethyl acetate:toluene=1:1:1). After application, the layer is dried at 100° C. It has good adhesion, a smooth surface and good mechanical strength.

*Example 5*

A polycarbonate foil of 4,4'-dihydroxy diphenyl dimethyl methane with a thickness of 0.1 mm. is coated by means of a strip-type casting device with an iron oxide lacquer suspension which was obtained by grinding 268 g. of γ-iron oxide for 36 hours with a solution of 50 g. of cellulose acetobutyrate (acetic acid content 42%, butyric acid content 23%) in 810 cc. of ethyl acetate and 96 cc. of methanol. After application, the layer is dried at 100° C. The magnetizable layer (thickness 0.005 to 0.05 mm.) shows good adhesion to the support with excellent mechanical strength.

*Example 6*

Polycarbonate foil obtained from 4,4'-dihydroxy diphenyl dimethyl methane and with a thickness of 0.04 mm. is coated with an iron oxide lacquer suspension having the following composition: 333 g. of γ-iron oxide, 83 g. of a copolymer of vinyl chloride and vinyl acetate, 30 g. of butyl benzyl phthalate and 844 cc. of acetone. The iron oxide was ground with the solution of the copolymer and the plasticizer for 48 hours in a vibrating mill.

After application, the layer was dried at 60° C. Magnetizable layers with thickness of 0.005 to 0.05 mm. adhere satisfactorily to the support.

*Example 7*

A foil of polyvinyl chloride with a thickness of 0.04 mm. is coated by means of a strip-type casting device with an iron oxide lacquer suspension which is obtained by grinding 250 g. of ferrosoferric oxide (magnetite) for 36 hours with a solution of 80 g. of a polycarbonate obtained from 4,4'-dihydroxy diphenyl ethyl methyl methane in 680 cc. of chloroform in a vibrating mill. The drying of the applied layer is carried out at 80 to 90° C. The magnetizable layer adheres satisfactorily to the support and has a high mechanical strength.

An acetyl cellulose foil can be used instead of a polyvinyl chloride foil, likewise with good results.

*Example 8*

A polyester foil (polyester of terephthalic acid and ethylene glycol) which has a thickness of 0.02 mm. and is provided with a suitable bonding preparation is coated with an iron oxide lacquer suspension which had been prepared by grinding 150 g. of γ-iron oxide for 36 hours with a solution of 40 g. of a polycarbonate obtained from 4,4'-dihydroxy diphenyl dimethyl methane in 940 cc. of chloroform in a vibrating mill. Drying after application of the layer takes place at 80° C. The layer adheres firmly to the support, excellent mechanical strength being obtained.

What we claim is:

1. Magnetic record carriers comprising a non-magnetic support and a magnetic coating adhered to said support, said coating being a dispersion of a magnetic powder in a non-magnetic film-forming binding agent, at least one of the members consisting of said non-magnetic support and said magnetic coating comprising a thermoplastic film-forming polyester of carbonic acid and a di-(monohydroxy-aryl)-alkane.

2. Magnetic record carriers comprising a non-magnetic support consisting essentially of a thermoplastic film-forming polyester of carbonic acid and a di-(monohydroxyaryl)-alkane, and a magnetic coating adhered to said support, said coating being a dispersion of a magnetic powder in a non-magnetic film-forming binding agent.

3. Magnetic record carriers comprising a non-magnetic support, and a magnetic coating, said coating adhered to said support being a dispersion of a magnetic powder in a non-magnetic film-forming binding agent, said binding agent consisting essentially of a thermoplastic film-forming polyester of carbonic acid and a di-(monohydroxyaryl)-alkane.

4. Magnetic record carriers comprising a non-magnetic support and a magnetic coating adhered to said support, said coating being a dispersion of a magnetic powder in a non-magnetic film-forming binding agent, at least one of the members consisting of said non-magnetic support and said magnetic coating comprising a film-forming polyester of carbonic acid and a mixture of di-(monohydroxyaryl) alkanes, said mixture also containing additional dihydroxy compounds selected from the group consisting of aliphatic, cycloaliphatic and aromatic compounds.

5. Magnetic record carriers comprising a non-magnetic support, and a magnetic coating adhered to said support, the support consisting essentially of a thermoplastic film-forming polyester of carbonic acid and a di-(monohydroxyaryl) alkane, and said coating being a dispersion of a magnetic powder in a non-magnetic film-forming binding agent, said binding agent consisting essentially of an acetal of linear organic polymers containing hydroxy groups and aromatic aldehydes containing at least one sulfonic acid group which group is at least partially neutralized by means of alkali metal.

6. The method of producing magnetic recording material comprising the steps of providing a non-magnetic film support of a polyester of carbonic acid and a di-(monohydroxyaryl) alkane, and coating the support with a magnetizable layer by applying to the support a dispersion of a magnetic powder in a solution of a binding agent in a solvent that softens the support.

7. The method according to claim 6 wherein the binding agent is essentially a polyester of carbonic acid and a di-(monohydroxyaryl) alkane.

8. The method of making magnetic recording material, characterized by the steps of casting on a polished surface from solution a layer of binder containing dispersed magnetic recording particles, the binder being essentially a thermoplastic film-forming polyester of carbonic acid and a di-(monohydroxyaryl) alkane, and then casting from solution over said layer, a supporting layer essentially of thermoplastic film-forming polyester of carbonic acid and a di-(monohydroxyaryl)-alkane to cause the two layers to adhere together.

References Cited in the file of this patent

UNITED STATES PATENTS

| | | |
|---|---|---|
| 2,455,652 | Bralley et al. | Dec. 7, 1948 |
| 2,607,710 | Schmelzle et al. | Aug. 19, 1952 |
| 2,789,965 | Reynolds et al. | Apr. 23, 1957 |
| 2,799,666 | Caldwell | July 16, 1957 |

FOREIGN PATENTS

| | | |
|---|---|---|
| 153,598 | Australia | Dec. 13, 1953 |
| 546,376 | Belgium | Mar. 23, 1956 |
| 546,377 | Belgium | May 23, 1956 |
| 954,244 | France | Dec. 21, 1949 |

OTHER REFERENCES

Chemical and Engineering News, April 8, 1957 (pages 20 and 22).

Ansgewandte Chemie 68, No. 20, 633–640, October 21, 1956.

Schmidt: Audio Engineering Society Journal, January 1953, pages 10 to 16.